June 13, 1950 — A. H. HEINRICH — 2,511,261
SWIVEL COUPLING FOR CONDUITS
Filed Dec. 17, 1946
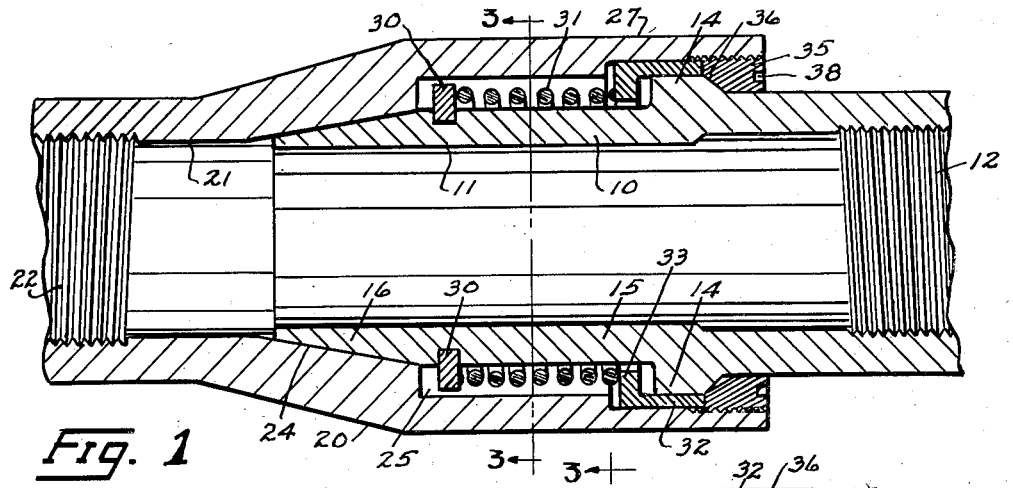
Fig. 1
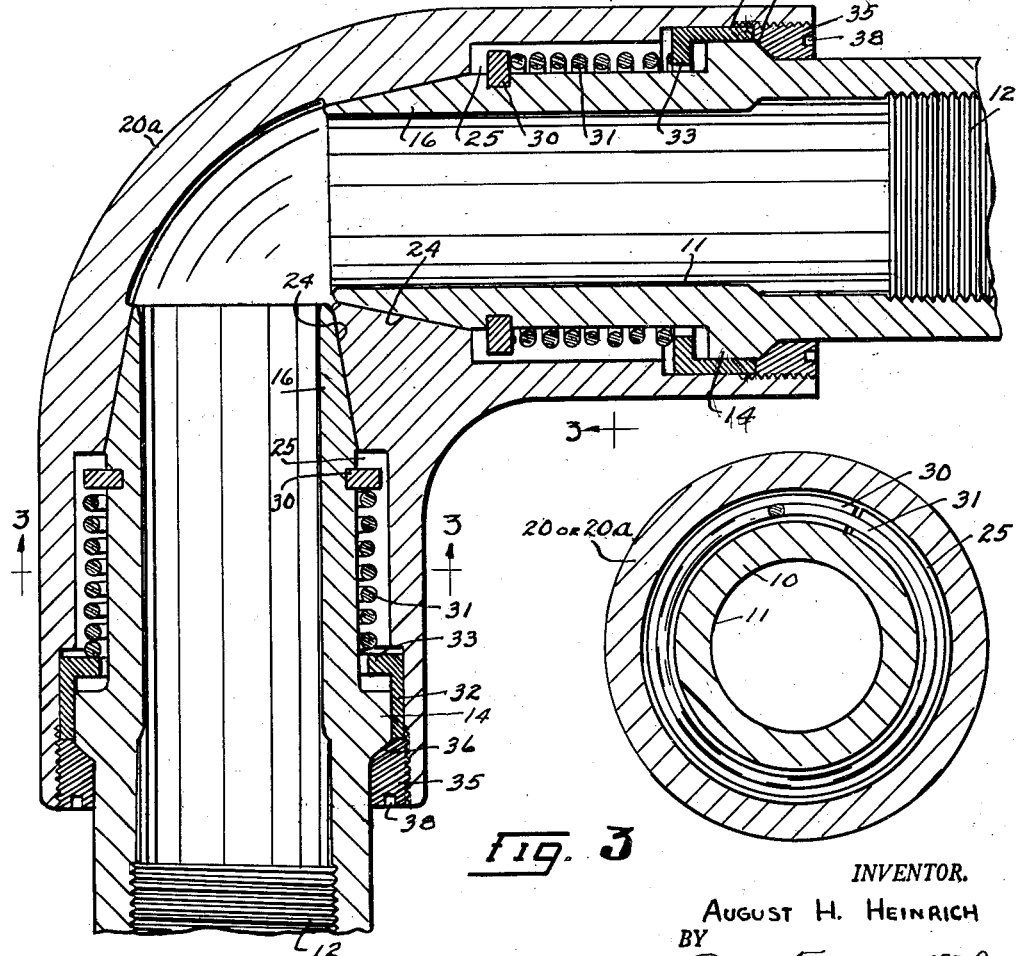
Fig. 2
Fig. 3
INVENTOR.
AUGUST H. HEINRICH
BY Bates, Teare & McKean
ATTORNEYS Patented June 13, 1950

2,511,261

UNITED STATES PATENT OFFICE 2,511,261

SWIVEL COUPLING FOR CONDUITS

August H. Heinrich, Euclid, Ohio, assignor to Auto-Diesel Piston Ring Company, Cleveland, Ohio, a corporation of Ohio Application December 17, 1946, Serial No. 716,849

10 Claims. (Cl. 285—97.6)

This invention relates to swivel joints and more particularly to a swivel joint in a conduit such as a pipe line, electric conduit, or the like.

An object of the invention is to provide such a swivel joint which without materially restricting the cross section of the conduit and without any great external enlargement will furnish a swivel connection automatically maintained tight notwithstanding wear.

It is also an object of the invention to provide a sturdy construction wherein the fluid-tight swivel joint will not be liable to be disturbed by accidental blows against the conduit.

In the drawings, Fig. 1 is a longitudinal section through one form of swivel coupling made in accordance my invention; Fig. 2 is a section of a conduit embodying two of my couplings in an elbow; Fig. 3 is a cross section through the coupling in any of the planes indicated by the lines 3—3 on Figs. 1 and 2.

In Fig. 1, I have illustrated a straight-line embodiment of my invention, in which 10 and 20 are male and female members, respectively, provided with internal passageways 11 and 21 in communication with each other and with suitable pipes (not shown) which may be screwed into the internal threads 12 and 22 respectively.

Within the female member 20 is a conically tapered seat 24 in direct communication at one end with the fluid passageway 21 and at the other end with an enlarged counterbore 25. The male member 10 is provided with an external enlargement 14 and then with a reduced cylindrical portion 15 terminating in a conically tapered section 16, the latter being turned, lapped or honed to the desired sealing fit with the seat 24. The female member 20 completely houses the reduced portion of the member 10 and may conveniently have a cylindrical exterior 27 for at least a portion of its length, the same being tapered down to the portion carrying the thread 22.

To maintain a fluid-tight seal and mechanical rigidity to the joint, spring means are provided to urge the male and female members together. To this end an annular groove is formed in the male member 10 near the junction of the tapered section 16 and the cylindrical section 15, and a split ring 30 is seated in this groove. A coil spring 31 surrounds the cylindrical portion 15 and bears against the abutment provided by this split ring. The spring bears at its other end against a sleeve 32 mounted in the female member whereby the spring may be compressed, as about to be explained.

As shown the sleeve 32 is L-shaped in cross section and thus has a cylindrical portion snugly but slidably engaging an enlarged bore of the female member and has an inwardly projecting flange 33 against which the spring rests. The sleeve bears against a ring 35 threaded into the endmost portion of the female member. The extreme inner end of this ring 35 is flat where it engages the sleeve while inward of such region it is conical at 36 and may bear against a complementarily conical surface on the enlargement 14 of the male member.

It results from the construction just described, that the spring is under compression between two abutments, namely, the split ring 30 on the male member and the sleeve 32 held by the ring 35 in the female member. The reaction of this spring maintains the conical end 16 with the male member in fluid-tight engagement with the complementary conical surface 24 of the female member.

When the parts are to be assembled the sleeve 32 is first placed about the male member with the inner periphery of the sleeve embracing the outer cylindrical surface of the enlargement 14 of the male member. Then the spring is put in place over the free end of the male member and then the split ring 30 is slid over such free end and expanded to slide into registration with the groove whereupon it contracts into the groove. This assembles the male member, the sleeve, the spring, and the split ring as a unit. This unit is now placed in the female member and then the retaining ring 35 screwed into place.

It will be seen that the free end of the retaining ring 35 bears against the sleeve 32 and forces it inwardly, compressing the spring, which thus seats the conical end of the male member snugly in the conical socket of the female member. The rotation of the retaining ring (which may be effected by a pin wrench applied to notches 38) is continued until its conical surface bears with just a running fit against the conical surface of the enlargement 14 of the male member. This results in a fluid-tight fit at the two pairs of conical surfaces; at the same time allows the turning of one member on the other. If these conical surfaces wear such wear is taken up by the expansion of the spring which always maintains a fluid-tight fit at the conical surfaces 24. The ring 35 at all times provides a safety member preventing the swivel joint being disturbed by any blow against the conduit.

As heretofore mentioned the swivel connection of Fig. 2 is the same at that of Fig. 1 so that no further description is necessary of the internal construction of Fig. 2 to which the same reference members apply. The female member of Fig. 2 however, it will readily be seen, is an elbow 20a having two sockets at an angle to each other, being shown as at a right angle. This makes a very simple construction providing at once an elbow with both the conduit leading to it and the conduit from it swivelly connected to it.

I claim:

1. A conduit coupling comprising two tubular members, one extending into the other, the one member having an internal outwardly facing frusto-conical seat in combination with another member having an external complementary shaped seat adjacent the inner end thereof, a ring threaded in the outer member and coacting with an external annular shoulder on the inner member to form a stop therefor, and a spring between the members bearing at one end against an outboard shoulder on the inner member and resisted at the other end by said ring.

2. A conduit coupling comprising two tubular members, one extending into the other, the one member having an internal outwardly facing frusto-conical seat in combination with another member having an external complementary shaped seat adjacent the inner end thereof, an outward shoulder on the inner member, a sleeve slidable in the space between the members, a spring compressed between the shoulder thereon and said sleeve, a ring threaded in the outer member and forming an abutment for said sleeve, said ring also coacting with an outward extension of the inner member to form a stop therefor.

3. A conduit coupling comprising two tubular members, one extending into the other, the one member having an internal outwardly facing frusto-conical seat in combination with another member having an external complementary shaped seat adjacent the inner end thereof, an outward shoulder on the inner member, a sleeve slidable in the space between the members and having an inwardly projecting flange, a helical compression spring surrounding the inner member and compressed between the shoulder thereon and said flange, and means carried by the outer member and forming an abutment for said sleeve.

4. In a swivel coupling for a conduit, a female member having an internal outwardly facing frusto-conical seat in combination with a male member having an external complementary shaped seat adjacent the inner end thereof, the male member having a second conical surface, a ring threaded in a female member and having a conical surface adapted to coact with said second conical surface on the male member to prevent separation of the coupling, and a spring housed between the members and held under compression between said ring and a shoulder on the male member to maintain the first mentioned conical surfaces in snug engagement.

5. In a swivel coupling for a conduit, a female member having an internal outwardly facing frusto-conical seat in combination with a male member having an external complementary shaped seat adjacent the inner end thereof, the male member having the second conical surface, a ring threaded in a female member having a second conical surface, a ring threaded in a female member and having a conical surface adapted to coact with said conical surface on the male member to prevent separation of the coupling and a helical compression spring housed between the members and bearing at one end against a shoulder on the male member, a sliding sleeve between the threaded ring and the other end of the spring to enable the ring to form an abutment for the spring and maintain the first-mentioned conical surfaces in snug engagement.

6. In a coupling, the combination of a male member having an external conical surface and an external shoulder, a female member having a complementary internal outwardly facing frusto-conical seat and having a recess into which the shoulder of the male member extends, said male member having an external annular enlargement, a slidable sleeve within the recess of the female member, a compression spring in said recess between said shoulder and said sleeve, and a ring threaded into the female member and forming an abutment for the sleeve, said enlargement and ring having complementary conical surfaces adapted to engage while allowing rotation of the male member relative to the female member.

7. In a coupling, the combination of a male member having an external conical surface and an external shoulder, a female member having a complementary internal outwardly facing frusto-conical seat and a recess into which the shoulder of the male member extends, said male member having an external annular enlargement, a sleeve within the female member having a skirt portion embracing said enlargement and a flange portion occupying said recess, a helical compression spring surrounding the male member and located in said recess between said shoulder and said flange portion of the sleeve, and a ring threaded into the female member and adapted to engage the skirt of the sleeve, said enlargement and ring having complementary conical surfaces adapted to engage while allowing rotation of the male member relative to the female member.

8. In a swivel coupling, the combination of a male member having a portion adjacent one end externally conical and having an outward enlargement near the other end and an outward shoulder between the conical surface and the enlargement, a female member having an internal outwardly facing frusto-conical surface complementary to the conical surface of the male member and having a recess occupied by the shoulder and the enlargement of the male member, a slidable sleeve ring within the female member embracing the said enlargement and having an inwardly projecting flange, a helical compression spring surrounding the male member and located in said recess between the shoulder and flange, the outer end of said enlargement being conical, and a ring threaded into the female member and having its extreme end adapted to engage said sleeve and being conical between the region of the sleeve engagement and the inner periphery of the ring, which conical surface is adapted to coact with the conical surface on the enlargement of the male member.

9. In a conduit coupling, the combination of a hollow elbow, each tubular section of which is provided with an internal conical surface flaring toward the open end of the section, a pair of male members entering opposite ends of the elbow and each having an external conical surface coacting with the respective conical surface of the elbow, a pair of rings surrounding the male members respectively and each threaded in the elbow and accessible outside of the projecting male member for axial adjustment of the ring, said ring having a conical surface adapted to coact with an external conical surface on the male member, a pair of springs located respectively between one of the male members and the elbow and bearing at one end against an external shoulder on the male member and at the other end against means positioned by said ring, whereby the ring forms an abutment for the spring.

10. In a conduit coupling the combination of a hollow elbow, each tubular section of which is provided with an internal conical surface flaring toward the open end of the section, a pair of male members entering opposite ends of the elbow and each having an external conical surface coacting with the respective conical surface of the elbow, a pair of removable rings respectively engaging the elbow and one of the male members for holding the latter in the elbow, and a pair of springs located respectively between one of the male members and the elbow and reacting axially against the male member and the surrounding ring to maintain said conical surfaces in fluid-tight engagement while allowing each male member to turn relative to the elbow.

AUGUST H. HEINRICH.

REFERENCES CITED

The following references are of record in the file of this patent:

UNITED STATES PATENTS

| Number | Name | Date |
|---|---|---|
| 1,160,639 | Mooney | Nov. 16, 1915 |
| 1,586,725 | Westinghouse | June 1, 1926 |
| 1,902,697 | Ellingsen | Mar. 21, 1933 |